United States Patent
Zawodny et al.

[19]

[11] Patent Number: 6,085,037
[45] Date of Patent: *Jul. 4, 2000

[54] APS CAMERA STRUCTURE FOR FILM PRELOADING

[75] Inventors: Arthur Zawodny, Tsing Yi Island; Bill Yung Wai Lam, Nam Tin; Eli Shoer, Wanchai; Franco Yik Kai Chung, New Territories, all of The Hong Kong Special Administrative Region of the People's Republic of China

[73] Assignee: Concord Camera Corp., Hollywood, Fla.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/855,149

[22] Filed: May 13, 1997

Related U.S. Application Data

[63] Continuation-in-part of application No. 08/713,780, Sep. 13, 1996, Pat. No. 5,689,733, which is a continuation-in-part of application No. 08/712,928, Sep. 13, 1996.

[51] Int. Cl.⁷ ........................... G03B 17/26; G03B 17/02; G03B 1/00
[52] U.S. Cl. .............................. 396/6; 396/387; 396/513; 396/538
[58] Field of Search ................................ 396/6, 513–516, 396/538, 284, 535, 387, 414

[56] References Cited

U.S. PATENT DOCUMENTS

| | | | |
|---|---|---|---|
| Re. 34,168 | 1/1993 | Ohmura et al. ...................... | 354/145.1 |
| 2,674,931 | 4/1954 | Mihalyi ........................ | 95/31 |
| 2,989,906 | 6/1961 | Rentschler ................ | 396/539 |
| 3,096,699 | 7/1963 | Harvey et al. ....................... | 396/535 X |
| 3,282,181 | 11/1966 | Lange ........................... | 95/11 |
| 3,481,261 | 12/1969 | Fischer et al. ........................... | 396/301 |
| 4,332,448 | 6/1982 | Zawodny ................... | 354/213 |
| 4,351,599 | 9/1982 | Suzuki et al. ........................ | 396/539 |
| 4,455,074 | 6/1984 | Wong et al. ......................... | 396/405 |
| 4,685,790 | 8/1987 | Uematsu .................... | 354/203 |
| 4,804,987 | 2/1989 | Arai .............................. | 396/6 |
| 4,855,774 | 8/1989 | Ohmura et al. ............................. | 396/6 |
| 4,954,857 | 9/1990 | Mochida et al. ............................ | 396/6 |
| 4,972,649 | 11/1990 | Mochida et al. ..................... | 396/535 X |
| 5,000,396 | 3/1991 | Barrella ............................... | 396/387 |
| 5,063,400 | 11/1991 | Takei et al. ................................ | 396/6 |
| 5,394,214 | 2/1995 | Petruchik ............................. | 396/535 |
| 5,452,036 | 9/1995 | Kamata .................... | 396/512 |
| 5,453,808 | 9/1995 | Zawodny et al. ....................... | 354/212 |
| 5,555,052 | 9/1996 | Pearson .................... | 354/203 |
| 5,555,054 | 9/1996 | Zander ................... | 354/212 |
| 5,555,063 | 9/1996 | Balling ................... | 354/288 |
| 5,574,337 | 11/1996 | Dunsmore .......................... | 315/241 P |
| 5,579,070 | 11/1996 | Smart et al. ............................ | 396/538 |
| 5,581,321 | 12/1996 | Boyd ....................... | 396/535 |
| 5,600,395 | 2/1997 | Balling et al. .............................. | 396/6 |
| 5,608,480 | 3/1997 | Smart et al. .............................. | 396/6 |
| 5,629,750 | 5/1997 | Smart et al. ............................. | 396/538 |
| 5,717,968 | 2/1998 | Stephenson, III et al. ............. | 396/315 |

FOREIGN PATENT DOCUMENTS

| | | |
|---|---|---|
| 145487 | 2/1952 | Australia . |
| 949324 | 9/1956 | Germany . |
| 48-46622 | 10/1971 | Japan . |
| 2130387A | 5/1984 | United Kingdom . |

*Primary Examiner*—Alan A. Mathews
*Attorney, Agent, or Firm*—Woodcock Washburn Kurtz Mackiewicz & Norris LLP

[57] ABSTRACT

An APS camera having various mechanical features that simplify film pre-loading, especially in single use APS cameras, is disclosed. The disclosed camera employs the film advance mechanism to open and close the APS film cassette's light lock door, and also employs a film sensor to disable the film advance mechanism from operating the light lock door when film is present in a film path of the camera. Camera size is kept to a minimum by a feature that defines a battery compartment within a film spool of the camera.

16 Claims, 12 Drawing Sheets

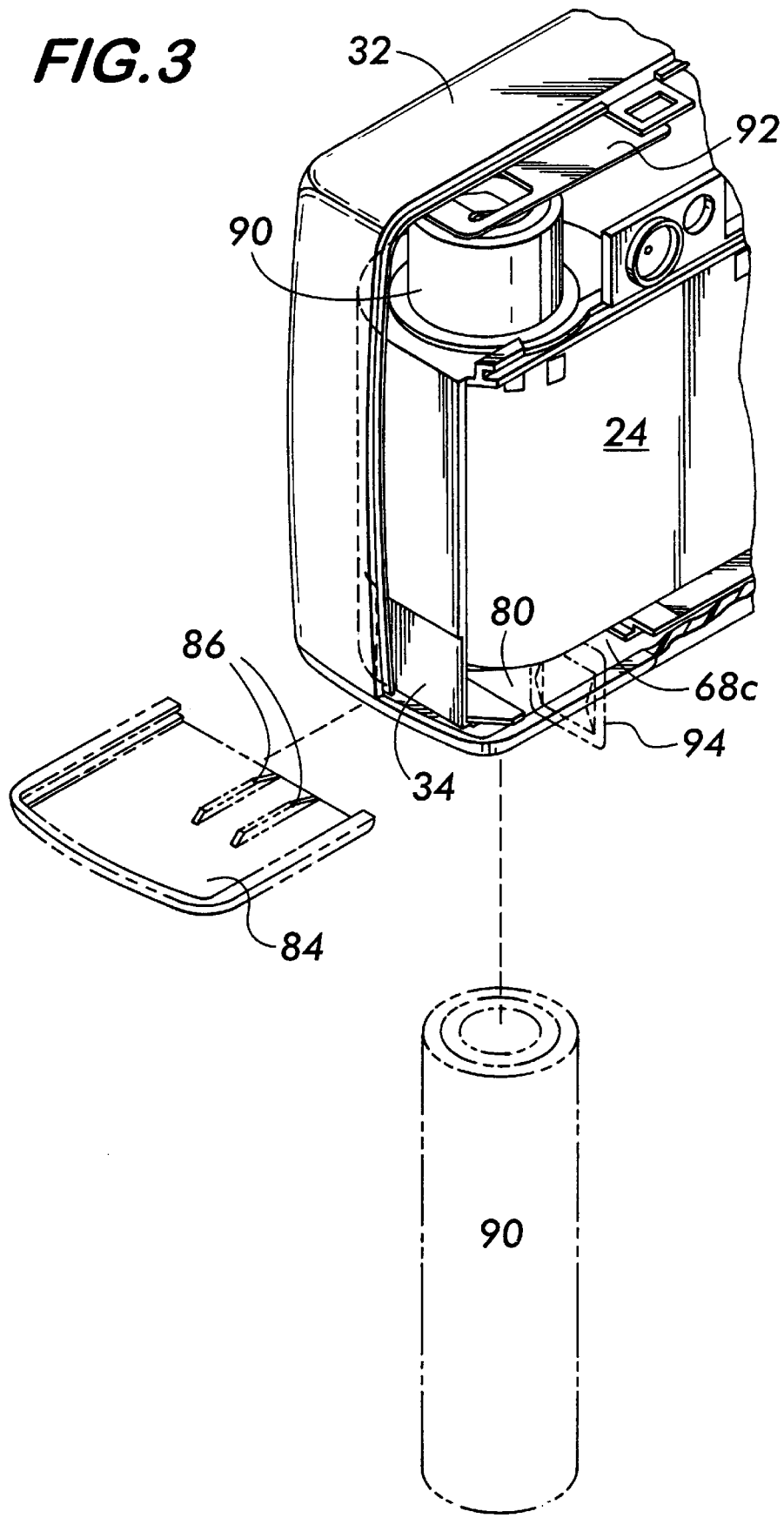

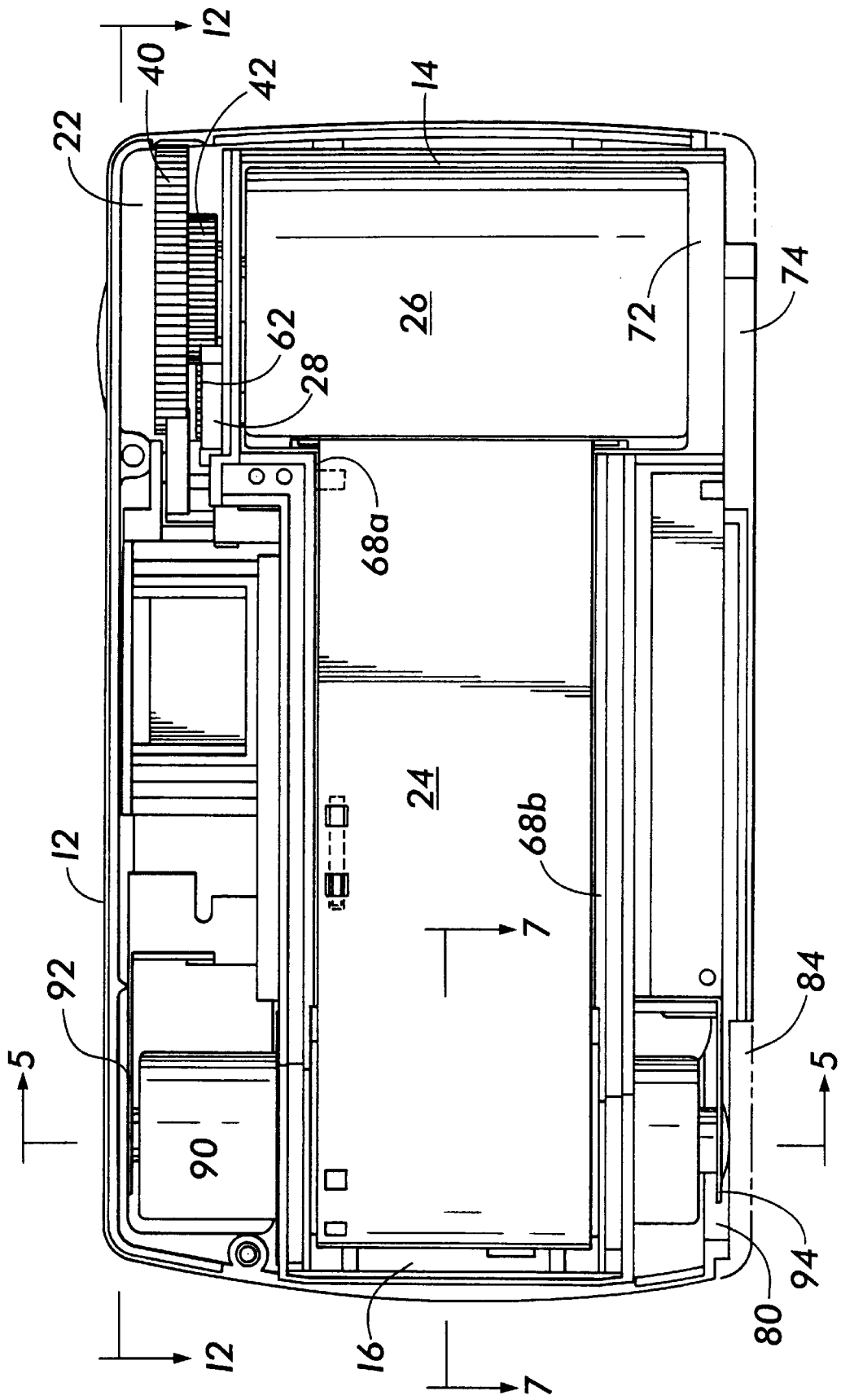

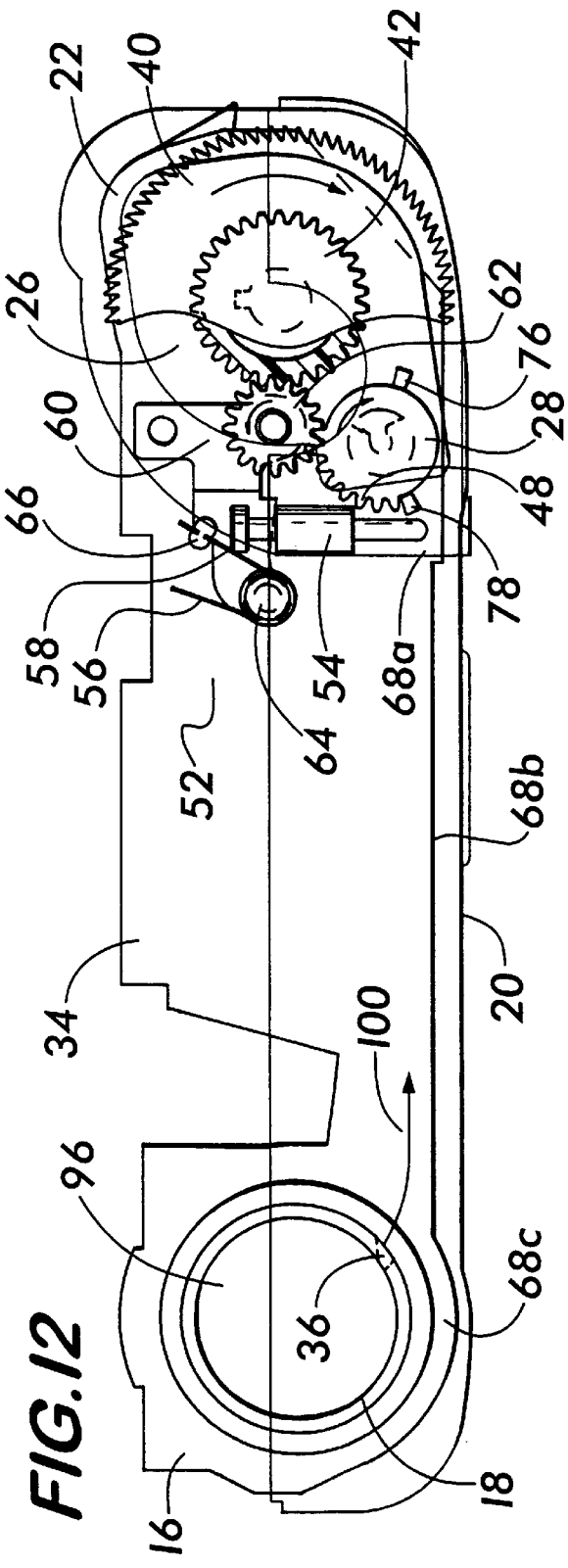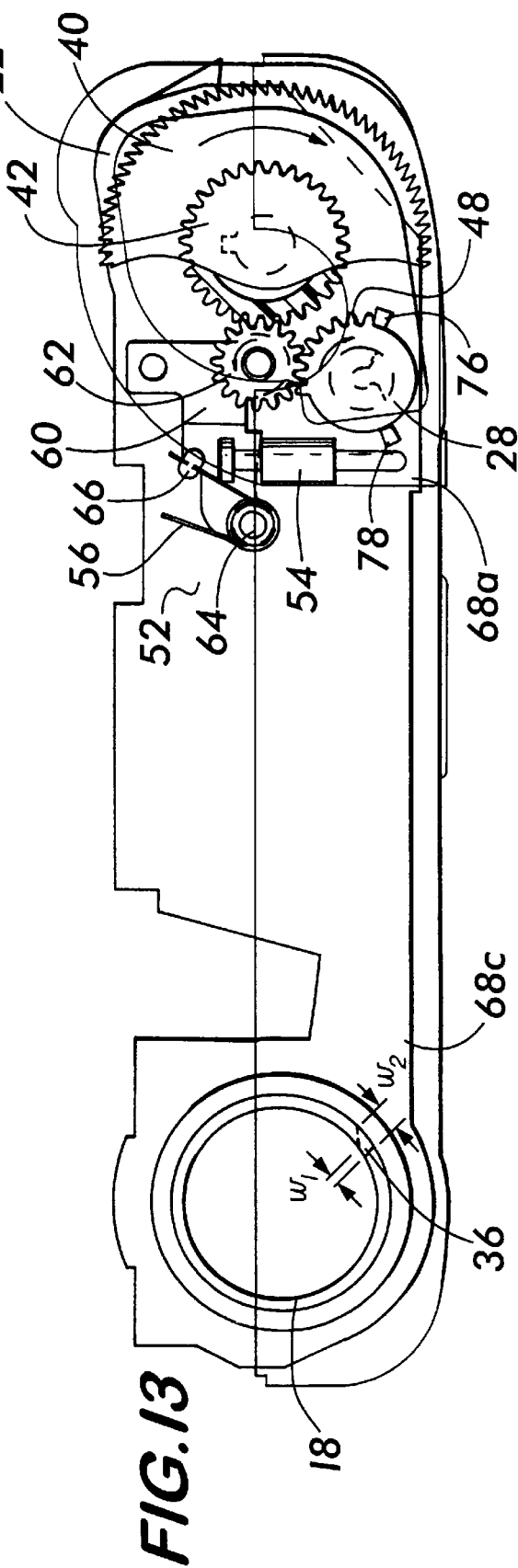

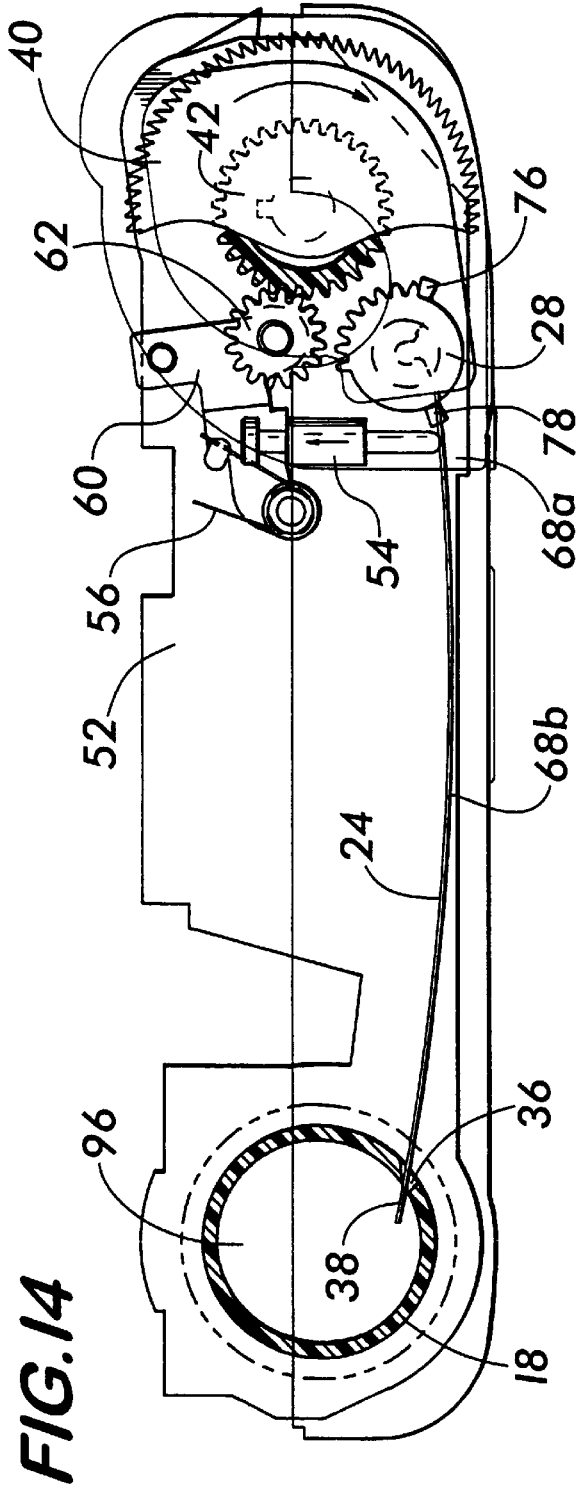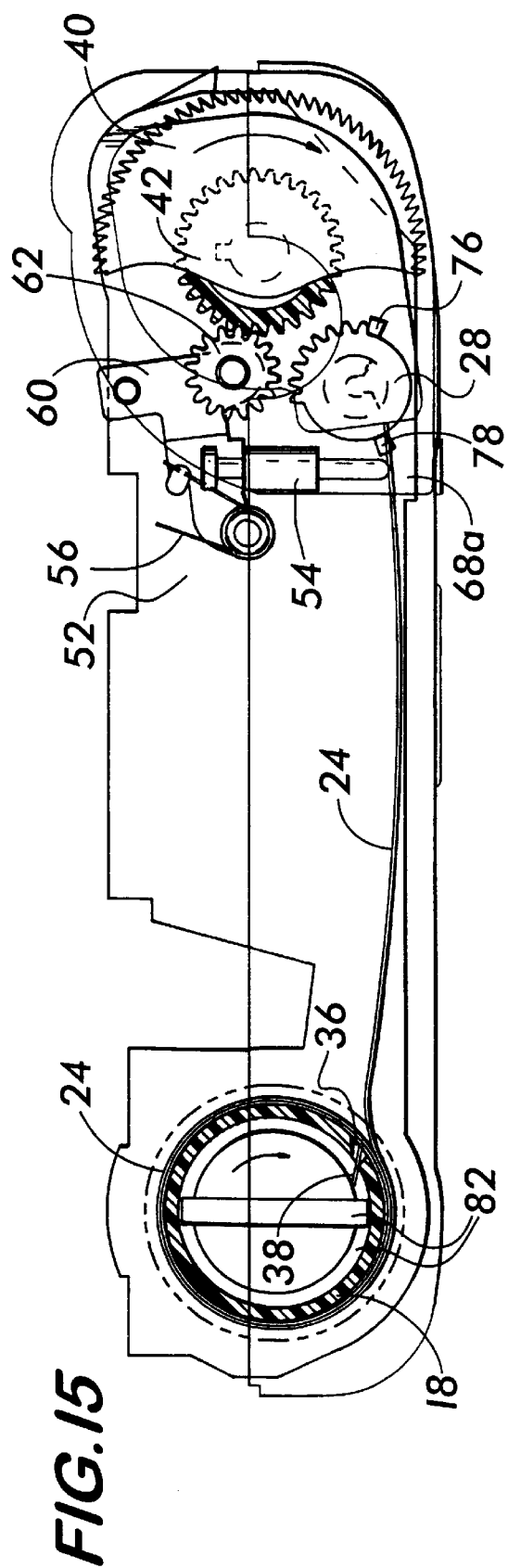

APS CAMERA STRUCTURE FOR FILM PRELOADING

RELATED APPLICATION DATA

This application is a continuation in part of co-pending, commonly assigned patent application Ser. No. 08/713,780 entitled "Film Loading Method for an APS Camera and an APS Camera Employing the Same", now U.S. Pat. No. 5,689,733, and, a continuation in part of co-pending, commonly assigned patent application Ser. No. 08/712,928 entitled "Camera with Battery Located Inside of Film Spool", now abandoned; both filed Sep. 13, 1996, and both of which are incorporated herein by reference in their entireties.

FIELD OF THE INVENTION

This invention relates generally to a method of loading film, and a battery, into a single use camera, particularly into a single use APS camera. This invention also relates to a single use camera that facilitates such loading method, to a single use camera with a battery loaded inside of a spool of pre-wound film, and to an APS camera (whether re-usable or single use) having mechanical features for operating the light lock door of an APS film cassette.

BACKGROUND OF THE INVENTION

Recently, a new type of film cassette has been developed, sometimes called a film safe cassette, which has a light lock door and does not, at the time of purchase, or at the time that the film is first inserted into the camera, have a film leader extending from the cassette to facilitate film loading. One example of film employing such a cassette is KODAK® brand ADVANTIX® film. The cameras with which these film cassettes are used are known as Advanced Photo System, or APS, cameras, and the film safe cassettes for use therewith are sometimes also called APS film cassettes. Conventional film cartridges, such as 35 mm film cartridges, have a film leader extending therefrom at the time of purchase, and a brush or similar mechanism at the cartridge's film slot to prevent light from entering the cartridge and exposing film contained therein. In contrast, a film safe cassette does not have a brush or similar mechanism but instead has a light lock door that is automatically opened by the camera after the film has been loaded. Film is loaded into and removed from the camera via a film cassette door disposed on the bottom of the camera. The camera then drives the film out of the cassette and into a film spooling area on the opposite side of the camera from the cassette. Before the cassette can be removed from the camera, the camera rewinds the film back into the cassette, and then closes the light lock door. If the light lock door were permitted to be opened in the presence of light, the film inside the cassette would be exposed. Thus, the light lock door, operating in conjunction with the camera, ensures that film is not inadvertently exposed.

In a conventional camera, such as a conventional 35 mm camera, film is loaded from the back of the camera by opening a back door thereof, dropping the cartridge into the camera, pulling the film leader across the camera, engaging the leader on a take-up spool, then closing the back door. Since opening the light lock door in the presence of light can expose the film in a film safe cassette, conventional methods of loading film cartridges are not suited to loading film safe cassettes into APS cameras. Moreover, because at least re-usable APS cameras employ a small cassette door on the bottom of the camera to load and unload the film cassette, there is no back cover or back door that can be easily opened to practice a conventional loading technique.

So called single use cameras are known in the art. A single use camera is one that is manufactured and sold with the intent of being used only a single time (i.e., with only one roll of pre-loaded film) by the purchaser or end user. Single use cameras are usually made of plastic. Film is pre-loaded into the camera during manufacturing, and the camera is sealed closed. This is done by loading the film into the back of the camera in much the same way as a conventional 35 mm camera is loaded, then securely assembling a back cover to the camera by a locking mechanism, screws, adhesives, thermal bonding, etc., so that the back cover cannot be easily removed. Typically, a package (such as paper, cardboard or even plastic) is placed around the camera body so that the film cannot be removed without destroying at least part of the package, and in some cases, without destroying part of the camera body as well. Additionally, film cannot be easily reloaded into the sealed camera, at least not without removing the back cover and/or partial destruction of the camera body or its packaging. As is known in connection with such cameras, it is intended that the user return the entire camera, intact, to a developing lab for processing after the user is finished taking exposures. The lab removes the exposed film and discards the camera body.

Single use APS cameras are also known in the art. It will be appreciated that loading a film safe cassette into a single use APS camera presents special problems. The light lock door cannot be opened without exposing the film in the cassette, so film loading and final camera assembly must take place in a darkroom. This assembly involves performing the following steps in darkroom conditions: opening the light lock door with a tool or fixture, externally of the camera; driving film from the cassette by rotating the spool inside the cassette either manually, with a tool, or with a fixture, external to the camera; spooling unexposed film into a film spool area of the camera either manually or with a fixture, external to the camera, and loading the film cassette from the back of the camera (i.e., with the back cover removed); then, assembling the back cover to the camera. If the camera requires a battery, then depending on the construction of the camera, the battery may have to be loaded in darkroom conditions. Thus, loading film into a single use APS camera is cumbersome, time consuming, and labor intensive.

Usually, in a single use camera, all of the film is pre-wound into the film spool area (sometimes called "pre-loading"), and, during picture taking, film is withdrawn back into the cassette, one frame at a time. Single use APS cameras usually automatically close the light lock door on the film cassette after all of the film has been rewound back into the cassette. This is usually done by means of a film sensor or other mechanism.

No known single use APS camera has any built-in mechanism for opening the light lock door after the film cassette has been loaded into the camera, much less doing so with the back cover in place on the camera, and thus known single use APS cameras are not presently amenable to a film loading process that can occur in non-darkroom conditions.

Many cameras contain at least one battery, and most all cameras with flashes have at least one battery, such as a size AA or AAA battery. In the prior art, these batteries are usually housed within a specially created and specially allocated space in the camera that defines a battery compartment. Since the battery compartment requires additional space inside the camera (relative to the same camera without a battery compartment), the overall size of a camera with a battery compartment is usually larger when compared to the same camera without a battery compartment. Increasing the camera's overall size may be undesirable, because consumers may desire smaller cameras, and adding a separate battery compartment may increase the cost of production. Moreover, in single use cameras, the battery cannot be easily removed, or can be removed only by destroying a portion of the camera or its packaging, because the battery compartment is sealed within the camera. Further, loading a battery into a single use camera pre-loaded with film may need to be done under darkroom conditions to avoid exposing the pre-loaded film.

It is desirable to provide a method for loading film, and a battery, into a single use APS camera that is simple and relatively labor free, and that does not require film or battery loading in darkroom conditions. It is also desirable to provide a single use APS camera that facilitates a non-darkroom film loading method. It is further desirable to provide a single use camera with a battery compartment that does not significantly increase the overall size of the camera (relative to the same camera without a battery compartment), that permits a battery to be inserted into the camera in non-darkroom conditions, and also facilitates easy removal of the battery. The present invention achieves these and other goals.

SUMMARY OF THE INVENTION

In the following summary, detailed description and appended claims, the terms "cassette" and "film cassette" refer to film containers generally, and such terms include APS (i.e., film safe) cassettes as well as 35 mm film cartridges, unless the context of usage indicates an intent to refer specifically to one type or the other. The terms "film safe cassette" (and "APS film cassette"), and 35 mm film cartridge, are used to refer to the specific types of film containers.

According to the present invention, there is provided: a method of pre-loading a single use APS camera with film from a film safe cassette in non-darkroom conditions, and a single use APS camera that facilitates such a method; a single use, manually operated, APS camera that is capable of both opening and closing the light lock door of the film safe cassette; an APS camera that operates the light lock door by means of the camera's film advance mechanism; a method of loading a battery inside the pre-wound film spool of a single use camera, in non-darkroom conditions, and a single use camera that facilitates such a method; and, a single use camera with a battery disposed within the film spool.

An APS camera according to the invention has a main body and a back cover securely affixed thereto. A film cassette compartment is disposed on one end, and a rotatable film spool is disposed in a film spool compartment on the other end. A film receiving slot is disposed in the spool, and a film path extends from the film cassette compartment to the film spool compartment. The camera is constructed such that, during a film loading process as described herein, the only path for meaningful amounts of light to enter the camera is via the film receiving slot and into the film path, but the film path is designed so that meaningful amounts of light cannot travel far enough there along toward the film safe cassette to expose film inside a film safe cassette whose light lock door has been opened to permit feeding of film for the film loading operation. Depending on the design of the film path, the level of ambient light that can enter the film path without exposing the film inside of the film safe cassette will vary. Preferably, the ambient light level in the assembly room during a film loading procedure is such that it allows for comfortable working conditions, but the assembly room need not be a dark room. For instance, the light level could be such that an assembler could read normal sized typed print or even fine print.

A method of loading film from a film safe cassette into such a camera comprises loading the film into the camera in non-darkroom conditions, such that light can enter at least a portion of the film path via the slot in the spool. The light lock door is opened (in the camera by means described below) and film is advanced from the film safe cassette toward the spool; the spool is oriented so that the slot therein is aligned with the path of travel of the film, and so that the advancement of the film causes a leading edge of the film to be received into the slot. The spool is then rotated (preferably, by external drive means) so that film is wound there around, thus blocking the light path through the slot and preventing any further light from entering the film path. Preferably, the spool is rotated sufficiently such that all frames of the non-exposed film are withdrawn from the film safe cassette and wound around the spool, i.e, the film is pre-wound on the spool and the camera is pre-loaded. During picture taking, film is withdrawn back into the film safe cassette, one frame at a time, as each frame is exposed. In an alternative embodiment, a spool driver is light tightedly inserted into the film spool before the light lock door is opened, so as to prevent light from entering the film path.

A preferred embodiment of the camera further comprises a manual film advancing means, such as a thumb wheel and associated drive components, for advancing the film as above described, and for withdrawing or rewinding the film back into the film safe cassette. According to one feature of the invention, the advancing means is coupled to a light lock door driver that performs the functions of both opening and closing the light lock door. The light lock door driver engages a light lock door actuator inside the film safe cassette and is responsive to rotation of the advancing means in one direction to open the light lock door, and is responsive to rotation of the advancing means in the other direction to close the light lock door when a film detection mechanism (sensor) detects that all film has been rewound. According to the film loading method of the present invention, a film safe cassette is loaded into the camera with the light lock door closed, through a cassette film loading port in the bottom of the camera, as is common in APS cameras. The advancing means is rotated in a first direction (e.g., by rotating the thumb wheel in a first direction) to cause the light lock door driver to open the light lock door; then, the light lock door driver is de-coupled from the advancing means so that further rotation thereof in the first direction is not impeded by the engagement of the light lock door driver with the light lock door actuator inside the film safe cassette. The advancing means is continued to be rotated in the first direction, causing film to advance out of the film safe cassette, into the film path of the camera, and into the film slot in the spool, as above described. The spool is rotated as above described to pre-wind the film on the spool and pre-load the camera. The camera is now ready for picture taking.

After the camera has been pre-loaded, a preventer engages the advancing means and prevents any further rotation in the first direction. Now, the advancing means can be rotated only in a second direction that is opposite to the first direction. During picture taking, the advancing means is rotated in the second direction to rewind the film back into the film safe cassette, one frame at a time as exposures are taken, as is common. The film detection mechanism detects when all of the film has been rewound, and in response thereto, allows the light lock door driver to become re-coupled to the advancing means. Further rotation of the advancing means in the second direction causes the light lock door driver to close the light lock door, whereby the film safe cassette is ready to be removed for processing.

In the single use camera described herein, a tubular structure is provided in the film spool compartment for receiving and winding film that is withdrawn from the film safe cassette. However, it is also possible to provide a single use camera wherein the film winds about itself (and not about any structure) in the film spool compartment and the wound film itself defines a spool. In both cases, a heretofore unused cylindrically shaped cavity exists within the spool. According to one aspect of the present invention, these cavities are advantageously used to house a battery, and thus camera size is not increased by the addition of a battery compartment. Though this aspect of the present invention is described herein as employing a tubular or cylindrical structure for the film spool, as used in the appended claims addressing this aspect of the invention, except as expressly otherwise noted therein, the terms "film spool" and "spool" mean both (i) a structure, such as a tube or other hollow cylindrical structure, about which film is, or can be, wound in the film spool compartment, and (ii) film wound about itself in the film spool compartment (i.e., the wound film itself defines a spool). Thus, in the first instance (i), the spool may or may not have film wrapped therearound. According to this aspect of the invention, there is provided a single use camera that includes a main body securely fastened to a back cover such that the back cover cannot be easily opened or removed or cannot be opened or removed without destroying at least a portion of the camera or the camera package. A film cassette, and a pre-wound film spool having a hollow core, are disposed within the main body on opposing sides of a film exposing area. One end of the hollow core defines a battery receiving end having an opening to the underside of the camera, and a pair of electrical contacts is mounted within the main body and arranged at opposing ends of the hollow core, with one of the electrical contacts being flexibly mounted adjacent the battery receiving end. A battery that has been inserted into the battery receiving end is disposed in the core, and the electrical contact adjacent the receiving end is bent over the battery terminal. A tab or door light tightedly closes the opening to the battery receiving end of the core, and is removable to extract the battery. Another tab or door disposed on the underside of the camera and aligned with the film cassette is also removable to expose the film cassette and permit removal of the cassette therethrough. The tabs or doors are preferably sealed, or covered by packaging to prevent opening thereof to expose the film cassette and battery in normal use of the camera by the end user. This aspect of the present invention is particularly suited to (but not limited to) APS cameras because APS film manufacturers specify that the diameter of the wound film not be less than 11 mm. Advantageously, a typical size AA battery is about 14 mm in diameter, and therefore the diameter of the battery compartment required to house a size AA battery comports well with film manufacturers' specifications.

The herein described film loading method is facilitated by the manner in which a battery is loaded into the camera. A final step of pre-loading the camera with film and a battery involves inserting the battery inside the film spool via the battery receiving opening to the core, which is the same opening that is employed to externally pre-wind the film, then closing the opening by means of the aforesaid tab or door. This step may also be conducted in non-darkroom conditions.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 3 is an isometric view illustrating the manner in which a battery is loaded into the camera of FIG. 1 according to the present invention;

FIG. 4 is a rear plan view of the camera of FIG. 1 with its back cover removed, according to the present invention;

FIG. 12 is a cross section taken through line 12—12 of FIG. 4 and illustrates the position of the light lock door driver when a film safe cassette is first loaded, and also after the driver has been operated to close the light lock door;

FIG. 13 is a cross section taken through line 12—12 of Figure and illustrates the position of the light lock door driver after it has been operated to open the light lock door;

FIG. 14 is a cross section taken through line 12—12 of FIG. 4 and illustrates the advancing means in a disengaged status from the light lock door driver;

FIG. 15 is a cross section taken through line 12—12 of FIG. 4 and illustrates film pre-loaded into the camera;

DETAILED DESCRIPTION OF THE PREFERRED EMBODIMENT

Figure 1:
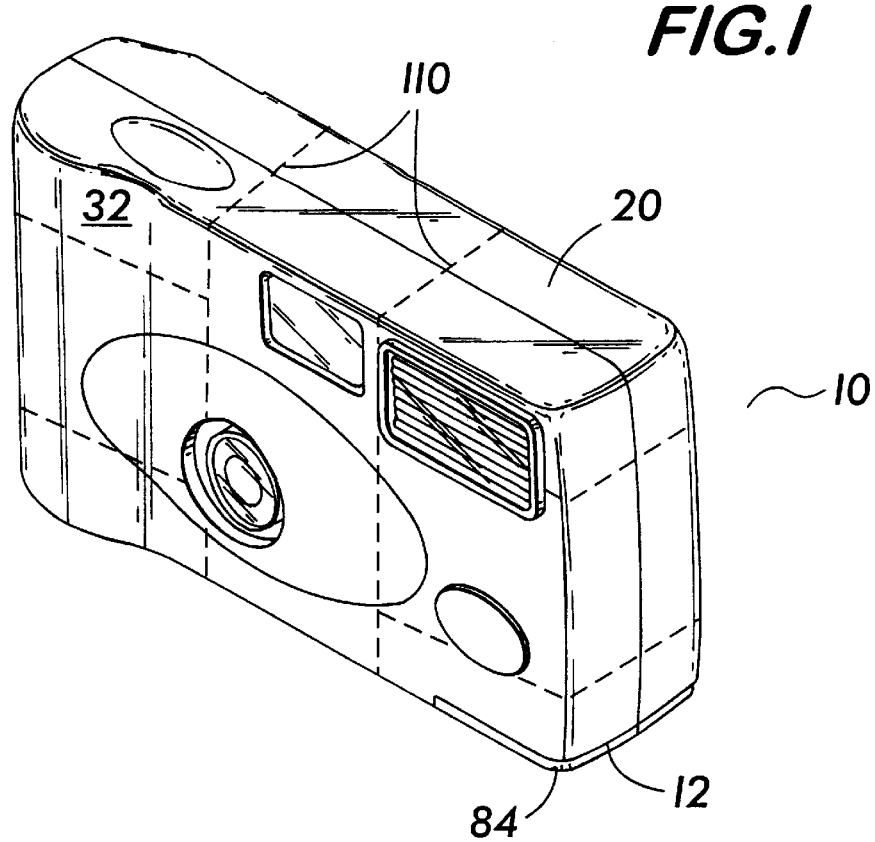
FIG. 1 is a front perspective view of one embodiment of a single use camera according to the present invention.

Referring now to the drawings, wherein like reference numerals designate corresponding structure throughout the views, there is shown a preferred embodiment of an APS camera 10 according to the present invention, and a method for loading film, and a battery, into the same in non-darkroom conditions. According to the preferred embodiment, the camera 10 is a single use APS camera, as more fully described herein, but certain aspects of the invention are not limited to single use cameras or to APS cameras, and the scope of the invention is not limited thereto, except as expressly noted in the following specification and claims. For example, the battery loading aspect of the present invention has applicability to single use cameras employing 35 mm film cartridges, and the light lock door opening and closing aspect has applicability to re-usable (i.e., non-single use) APS cameras.

Figure 10:
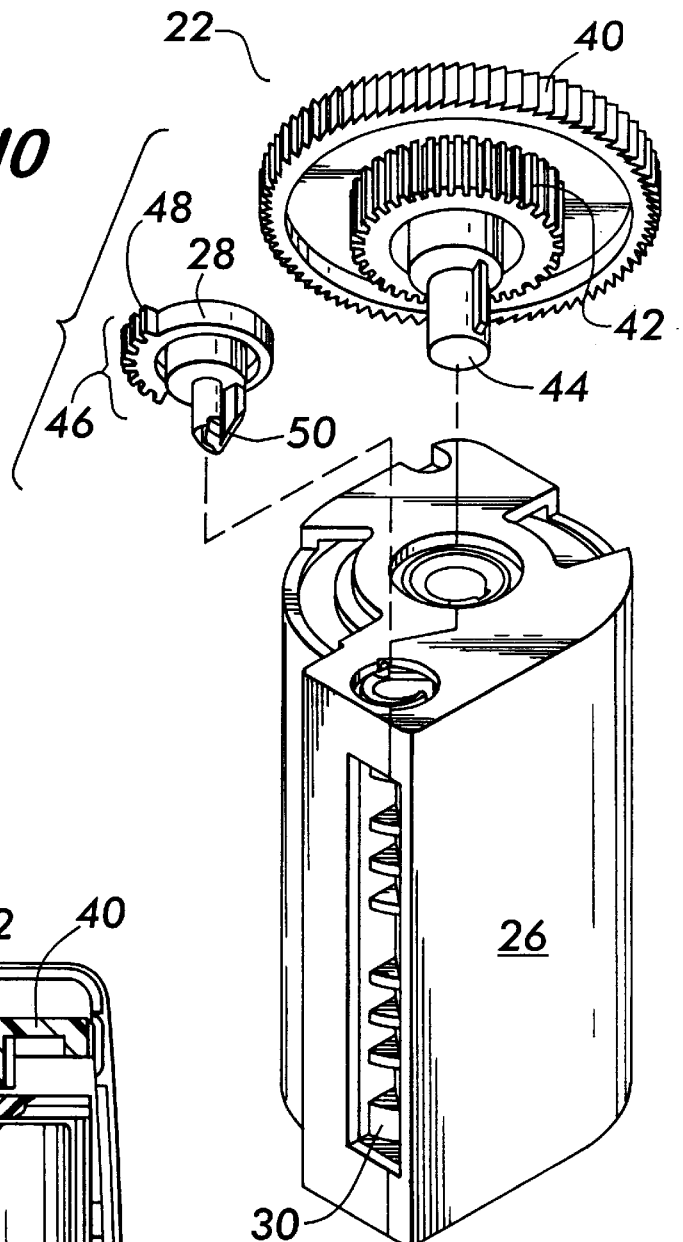
FIG. 10 is an isometric view illustrating the cooperation among a film safe cassette employed in the camera of FIG. 1, a portion of a film advancing means therefor, and a light lock door driver.

Camera 10 includes a main body 12 having a film cassette compartment 14, a film spool compartment 16, a rotatable film spool 18 in the film spool compartment 14, a back cover 20, a film advancing means 22 mounted within the main body 12 for advancing film 24 from a film cassette 26 in the film cassette compartment 14 to the film spool 18 and from the film spool 18 to the film cassette 26, and a film cassette light lock door driver 28 for operating a film cassette light lock door 30 driven by the advancing means 22. As best shown in FIG. 10, the illustrated film cassette 26 is an APS (film safe) cassette.

In the illustrated embodiment of the camera 10, the main body 12 also includes a front, or front cover, 32, of the camera 10. However, the term "main body," as used herein and in the appended claims, is not intended to be so limited. Except as otherwise noted, or as shown in the drawings, or except as the context and usage may indicate, the term "main body" is intended to mean both: (i) an inner body 34 of the camera 10, as herein described, with an integral front 32, or with the front cover 32 attached; and (ii) only the inner body 34 of the camera 10. Moreover, it is preferred that the embodiment of the camera disclosed herein, including the front cover 32, back cover 20 and main body 12 (including inner body 34) be manufactured from a molded plastic.

The film spool 18 preferably has a film receiving slot 36. The film receiving slot 36 receives an edge 38 of the film 24 when the film 24 is transferred from the film cassette 26 to the film spool 18. FIGS. 12 and 13 depict the slot 36 prior to film 24 being transferred to the film spool 18. FIG. 14 illustrates the film 24 being transferred from the film cassette 26 and being inserted into the slot 36. FIG. 15 illustrates the film 24 wound around the film spool 18 with the edge 38 of the film 24 in the slot 36.

Figure 11:
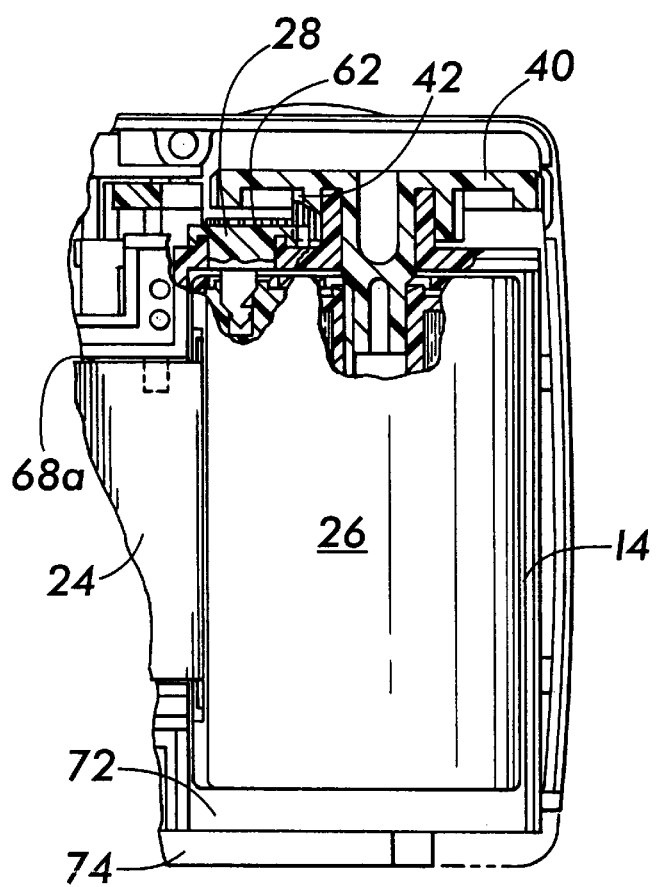
FIG. 11 is a partial cut-away view of the right-most portion of FIG. 4.

The advancing means 22 is depicted in FIGS. 4 and 10–15 and is rotatably mounted within the main body 12. The advancing means 22 includes a manual advance wheel 40, preferably in the form of a thumb wheel, a driving gear 42 and a shaft 44 for engaging the internal spool of the film cassette 26. As is clearly shown in FIGS. 10 and 11, since the advance wheel 40 is common with the driving gear 42 and the shaft 44, rotation of the advance wheel 40 will cause rotation of the driving gear 42 and the shaft 44. The shaft 44 mates with the film cassette 26 so that rotation of the advance wheel 40 will cause film 24 to be driven out of and withdrawn into the cassette 26 when the light lock door 30 is open. Also illustrated in FIGS. 4 and 10–16 is the light lock door driver 28. The light lock door driver 28 contains a segmented portion 46 which has teeth 48 there around. As shown in FIGS. 12–16, the light lock door driver 28 is rotatably mounted within the main body 12. The light lock door driver 28 has a shaft 50 (FIG. 10) that mates with an internal actuator in the cassette 26 so that rotation of the light lock door driver 28 operates the light lock door 30 to either an open or closed position. FIGS. 10 and 11 best illustrate the mating of the light lock door driver 28 with the cassette 26.

As shown best in FIGS. 10–16, the light lock door driver 28 is operatively engageable and disengageable with the advancing means 22. When the advancing means 22 is coupled to (engaged with) the driver 28 (FIGS. 12 and 13), rotation of the advancing means 22 will cause rotation of the light lock door driver 28. Rotation of the light lock door driver 28 causes the light lock door 30 to change from an open position to a closed position, or from a closed position to an open position, as will become more apparent hereinafter.

Figure 16:
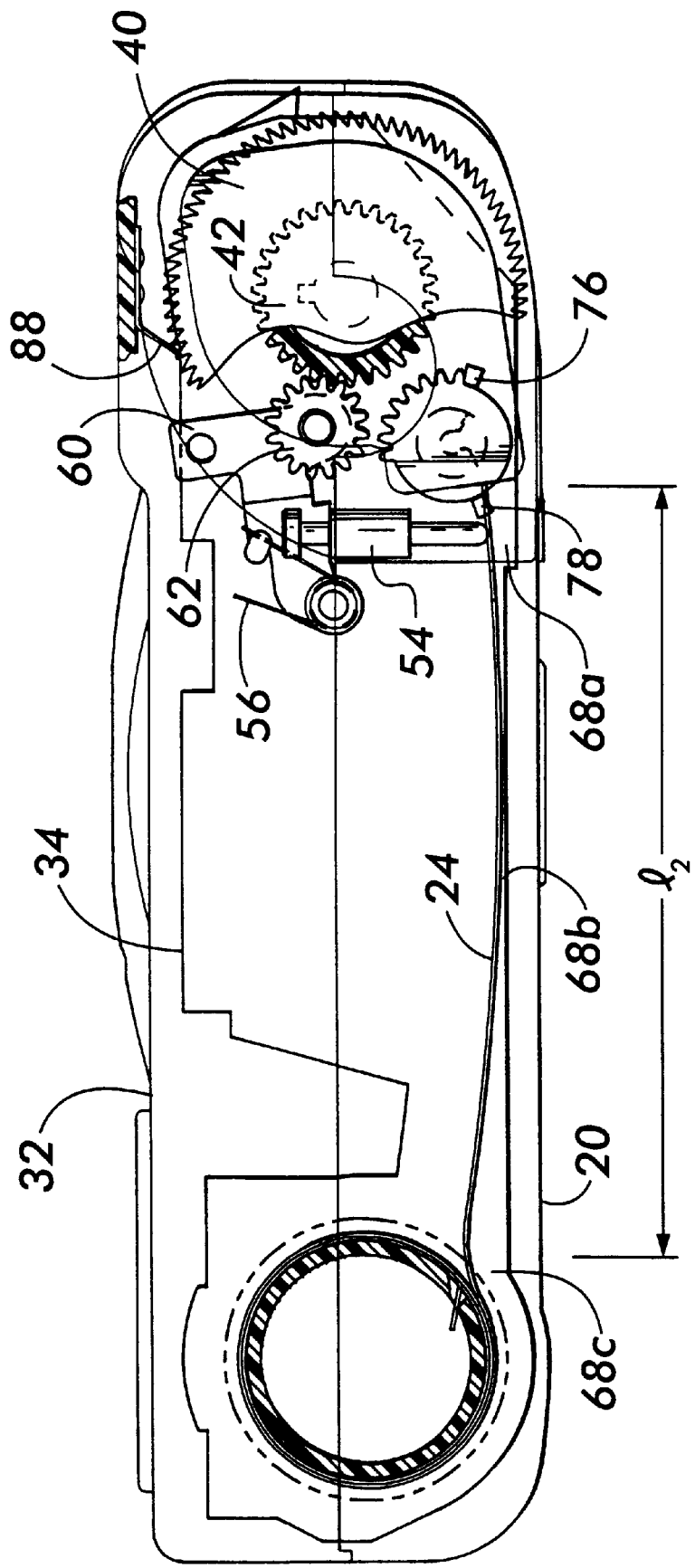
FIG. 16 is a cross section taken through line 12—12 and illustrates a preventer engaged with the advancing means so as to prevent rotation of the advancing means in the first direction, as above described.

Camera 10 also includes an actuating mechanism 52 for coupling and decoupling the advancing means 22 to and from the driver 28. As shown in FIGS. 12–16, the actuating mechanism 52 includes a film sensor 54, a spring 56, a pivotable lever 60, and a coupling gear 62. The lever 60 is pivotally mounted within the main body 12 on a pin 64; spring 56 is also mounted on pin 64. The sensor 54 and the coupling gear 62 are mounted to the lever 60 as shown, and spring 56 has an arm 58 that urges against a post 66 on the lever 60. As is shown in FIGS. 12–16, the lever 60 and the attached sensor 54 are biased by the spring 56 towards the back cover 20. The sensor 54 is urged against film 24 when film is present. It will be noted that the sensor 54 is located immediately adjacent to the location where the light lock door 30 resides when a film safe cassette 26 is present in the camera. As will become apparent, this permits the sensor 54 to detect when all of the film has been rewound. As best seen in FIGS. 12–16, the coupling gear 62 couples the advancing means 22 (via the driving gear 42) to the driver 28 (via segmented portion 46) when lever 60 is in a first position (FIGS. 12 and 13), and decouples the advancing means 22 from the driver 28 when lever 60 is in a second position (FIGS. 14–16). As will become apparent hereinafter, the lever 60 is in the first position when no film 24 is in the portion of the film path 68a, and is in the second position either (i) during a film loading procedure, or (ii) when film is present in the portion of the film path 68a. As will be appreciated, the entire film path is defined in the Figures as comprising three portions: portion 68a adjacent the film cassette 26; portion 68c adjacent the film spool 18; and, portion 68b extending therebetween. The portion 68b therefore includes a portion behind a shutter and lens 70 of the camera 10 such that the portion 68b that is behind the shutter and lens 70 of the camera defines a film exposing area of the camera 10.

FIG. 12 shows the coupling gear 62 engaged with the driving gear 42 and the light lock door driver 28. Rotation of the advance wheel 40 rotates driving gear 42. With the coupling gear 62 engaged as shown in FIG. 12, rotation of the advance wheel 40 in a clockwise direction causes rotation of the coupling gear 62 in a counter-clockwise direction, which in turn, causes rotation of the light lock door driver 28 in a clockwise direction, as indicated by the arrows on each of the elements 28, 40 and 62 in FIG. 12. Since shaft 50 engages the film cassette's internal light lock door actuator, the clockwise rotation of the light lock door driver 28 is operative to open the light lock door 30. FIG. 13 illustrates the position of the light lock door driver 28 after it has been driven by the advancing means to open the light lock door 30. Note that the sensor 54 projects into the film path 68a along which film 24 will travel when ejected from the cassette 26.

FIG. 14 depicts the lever 60 in a retracted position. Lever 60 is retracted either manually, or by means of a fixture (not shown), after the light lock door 30 has been opened as above described. While lever 60 is being retracted, it pivots about pin 64; retraction of the lever 60 de-couples coupling gear 62 from light lock door driver 28, as shown. Thus, further rotation of advance wheel 40 cannot alter the position of the light lock door 30. However, the shaft 44 of the advancing means remains engaged with the internal spool of film cassette 26 such that rotation of the advancing means will rotate the internal spool, and further rotation of the advance wheel 40 in a clockwise direction will drive film out of the cassette 26. Retraction of lever 60 also pulls the sensor 54 toward the front of the camera, and out of the film path 68a, as shown by the arrow inside the sensor 54 depicted in FIG. 14.

A film loading operation, and the attendant operation of the actuating mechanism 52, the sensor 54, the advancing means 22 and the light lock door driver 28, are explained below in further detail with reference to FIGS. 12–15. With the main body 12 securely assembled to the back cover 20 of the camera 10, a film cassette 26 is inserted into the film cassette compartment 14 via a film cassette loading port 72 in the bottom in the camera (see FIGS. 4 and 11) so that the shafts 44 and 50 engage their respective counterparts inside the film cassette 26. A tab or door 74 is securely mounted to light tightedly cover the film cassette loading port 72. Lever 60 and driver 28 will be oriented as shown in FIG. 12, i.e., the lever 60 will not be retracted, the coupling gear 62 will be engaged with the driver 28, and the sensor 54 will project into the film path 68a. Clockwise rotation of the advance wheel 40 will open the light lock door 30, as above described. FIG. 13 illustrates the orientation of these elements at this juncture. Further rotation of the advance wheel 40 is inhibited by a stop 76, as described below.

Next, the lever 60 is retracted either manually or with the aid of a fixture (not shown). This de-couples the coupling gear 62 from the driver 28, thus freeing advance wheel 40 to again rotate clockwise. This is shown in FIG. 14. Retraction of the lever 60 also pulls the sensor 54 in toward the front of the camera 10 (i.e., in the direction shown by the arrow inside sensor 54 in FIG. 14), so that the sensor 54 is disposed out of the film path 68a. With the lever 60 retracted, the advance wheel 40 is further rotated clockwise to drive film 24 out of cassette 26 and into the film path 68a, b, c. The spool 18 has been previously rotated so that the film receiving slot 36 is aligned with the path of travel of the film 24 along the film path 68c. As the advance wheel 40 is continued to be rotated clockwise to drive the film, a leading edge 38 of the film 24 is received into the slot 36, as also shown in FIG. 14. The film installer may look into the opening 80 to ensure that the leading edge 38 has been received into the slot 36 before proceeding further. At this juncture, the lever 60 may be released. The spring 56 biases the lever 60 toward its non-retracted position (i.e., toward the back cover 20). However, as shown in FIG. 15, the sensor 54 contacts the film 24, thus preventing the lever 60 from fully returning to its original position, and thus keeping the driver 28 de-coupled from the coupling gear 62. Hence, the light lock door 30 will still not be operated by rotation of advance wheel 40.

Figure 17:
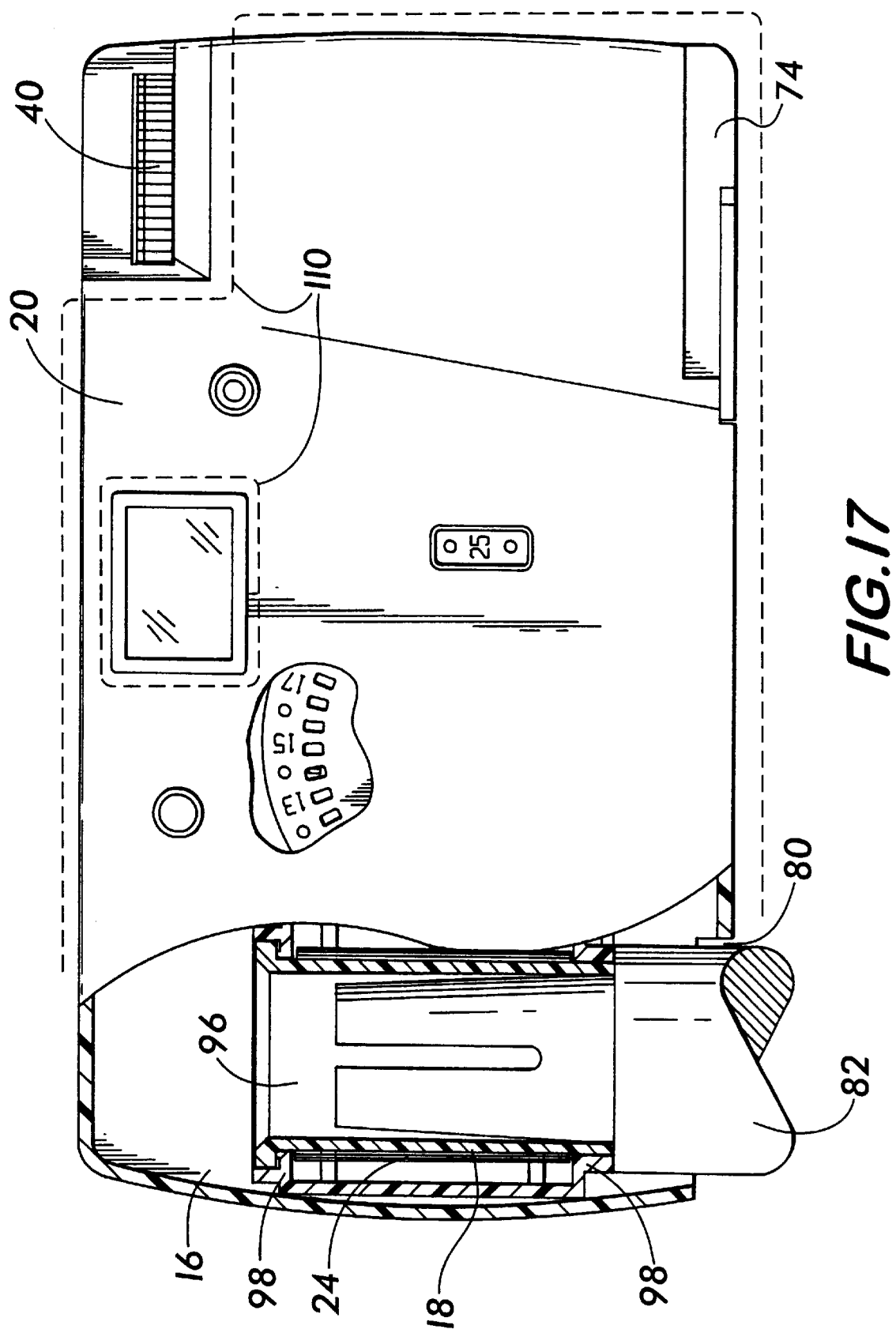
FIG. 17 is a partial cut away rear plan view of the camera of FIG. 2 and illustrates the film spool and a film spool driver.

Film is withdrawn from the cassette 26 and pre-wound onto the spool 18 by means of an external driver 82 that is adapted to engage the interior peripheral surface of spool 18. See FIGS. 15 and 17. Driver 82 is rotated so as to rotate spool 18 via opening 80 in the bottom of the camera until pre-winding has been completed. The pre-wound film on spool 18 and the cassette 26 are thus arranged at opposite sides of the camera 10, and the film 24 traverses the film exposing area of the camera. At this juncture, the driver 82 is removed, and unless a battery is to be inserted into the camera 10 (as discussed more fully below), a door or tab 84 is secured in place to light tightedly cover the opening 80. As discussed more fully hereinafter, the spool 18 is mounted rotatedly within the main body 12 in a light tight manner such that the only meaningful light path into the camera exists via the slot 36, and this exists only until film has been wound onto spool 18. The camera 10 is now ready to take exposures.

As exposures are taken, film is rewound from the spool 18 back to the film cassette 26, one frame at a time, by counterclockwise rotation of the advance wheel 40. After the last frame has been exposed, continued counterclockwise rotation of the advance wheel 40 pulls the leading edge 38 of the film 24 from the slot 36, and across the sensor 54. At this point, as is shown in FIG. 12, the sensor 54 is no longer restrained by the film 24. The bias exerted by the spring 56 urges the sensor 54 back into the film path 68a, and the lever 60 biases back to its original position, i.e., towards the back cover, causing the coupling gear 62 to re-couple with the driver 28. Further counter-clockwise rotation of the advance wheel 40 thus rotates driver 28 in a counter-clockwise direction, thus closing the light lock door 30.

Preferably, the driver 28 cooperates with a pair of stops, an opening stop 76 and a closing stop 78, as shown in FIGS. 12 and 13. When the driver 28 is rotated clockwise, as shown by the arrow in FIG. 13, the teeth 48 of the driver 28 are driven against the opening stop 76, thus preventing further rotation of the driver 28, and preventing damage to the light lock door actuator inside the film cassette 26. Likewise, when the driver 28 has been rotated counter-clockwise, the teeth 48 of the driver 28 are driven against the closing stop 78, again preventing further rotation of the driver 28. See FIG. 12. When the driver 28 is prevented from rotating by the stops 76, 78, the advance wheel 40 is also prevented from rotating, unless it has been disengaged from the driver 28 as described above. Since the advance wheel 40 cannot be rotated once the driver 28 reaches the closing stop 78, the closing stop 78 also functions to inform the camera user when all of the film 24 as been rewound into the film cassette 26.

As illustrated in FIG. 16, the camera may also include a claw preventer 88 mounted to the front cover 32 of the main body 12 and cooperating with the advance wheel 40. The claw preventer 88 prevents rotation of the advance wheel 40 in a clockwise direction, i.e., the direction that drives film 24 out of the film cassette 26. The claw preventer 88 does permit counter-clockwise rotation of the advance wheel 40, i.e., in the direction that rewinds film 24 back into the film cassette 26.

During the initial phases of the film loading process described above, the front cover 32 is not assembled to the inner body 34. Consequently, the claw preventer 88 attached to the front cover 32 is not engaged with the film advance wheel 40 mounted on the inner body 34. Hence, the claw preventer 88 does not prevent the above described clockwise rotation of the advance wheel 40. After film 24 has been pre-wound onto the film spool 18, the front cover 32 is affixed to the inner body 34 and the claw preventer 88 is permitted to engage the advance wheel 40 as shown in FIG. 16. It should be noted that no portion of the film path 68a, b, c (and hence none of the film 24) is exposed when front cover 32 is removed.

The camera 10 may also include a battery 90, for example, if the camera has a flash unit. Preferably, as more fully described below, a battery compartment is defined inside the film spool 18. A pair of electrical contacts 92 and 94 are disposed adjacent opposite ends of the spool 18 and are arranged to make contact with the battery terminals of, e.g., a size AA battery. Contact 94 is preferably flexibly mounted to the main body 12 as shown in FIG. 3 to facilitate battery loading. In particular, after the film has been pre-wound on the spool 18 as above described, the battery 90 may be inserted into a hollow core 96 of the spool via opening 80, and the contact 94 may be bent there over. Tab 84 light tightedly closes the opening 80, and the raised portions 86 thereof urge the upper terminal of the battery against contact 92 while urging the contact 94 against the lower terminal of the battery. See FIGS. 3–6 and 8. Battery 90 is preferably a size AA battery and the hollow core 96 has a diameter and length sized accordingly, but the invention may be carried out with other battery sizes, such as size AAA or even size C batteries.

The tabs 74 and 84 are preferably installed in such a manner that prevents easy removal by an end user, e.g., by locking mechanisms, bonding, adhesives, etc.

Figure 6:
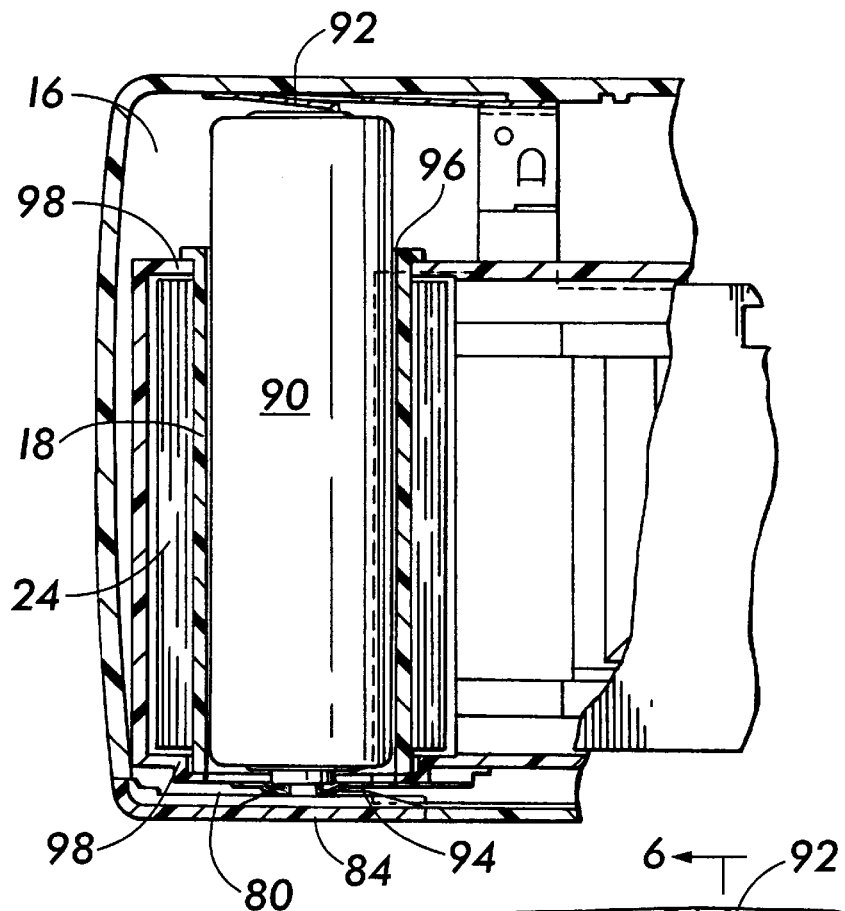
FIG. 6 is a cross section taken through line 6—6 of FIG. 5.
Figure 5:
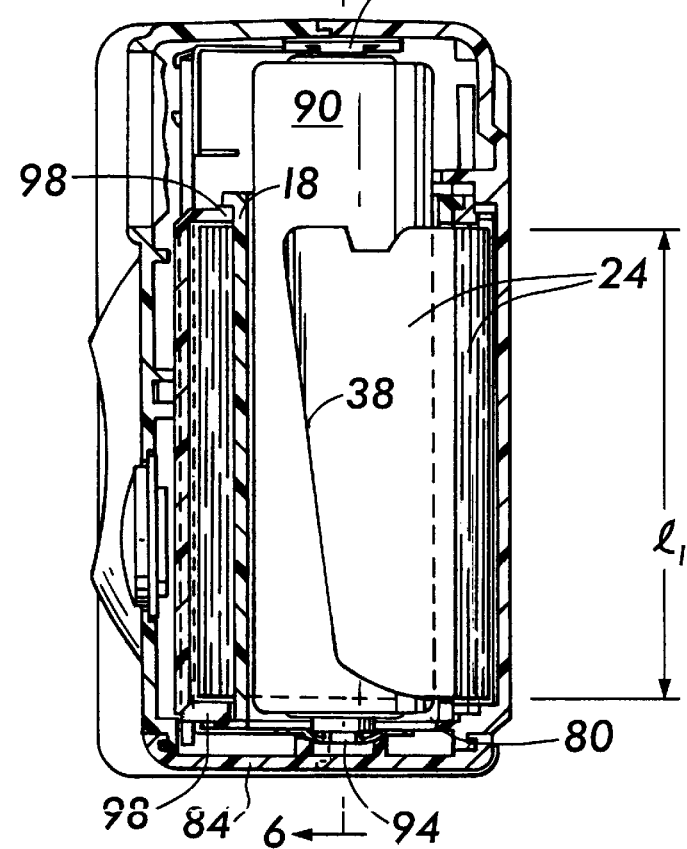
FIG. 5 is a cross section taken through line 5—5 of FIG. 4.
Figure 7:
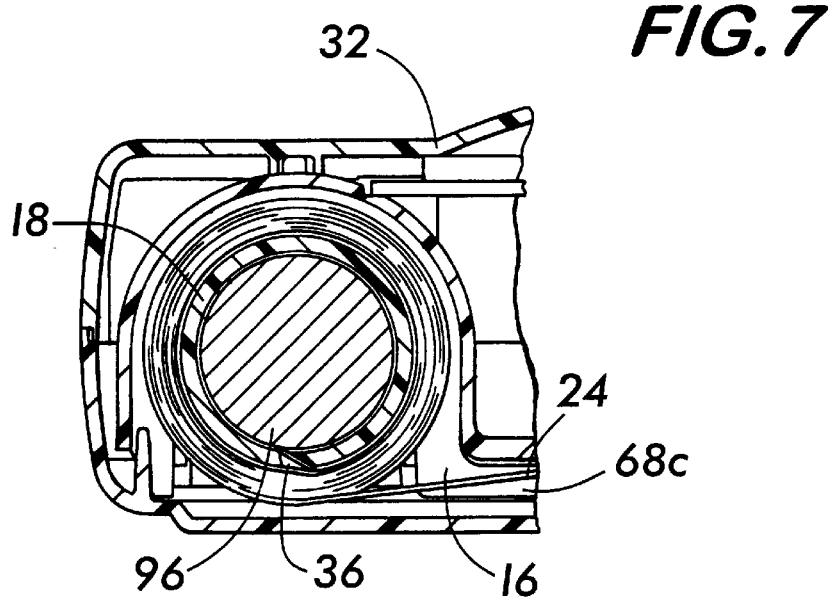
FIG. 7 is a cross section taken through line 7—7 of FIG. 4.
Figure 8:
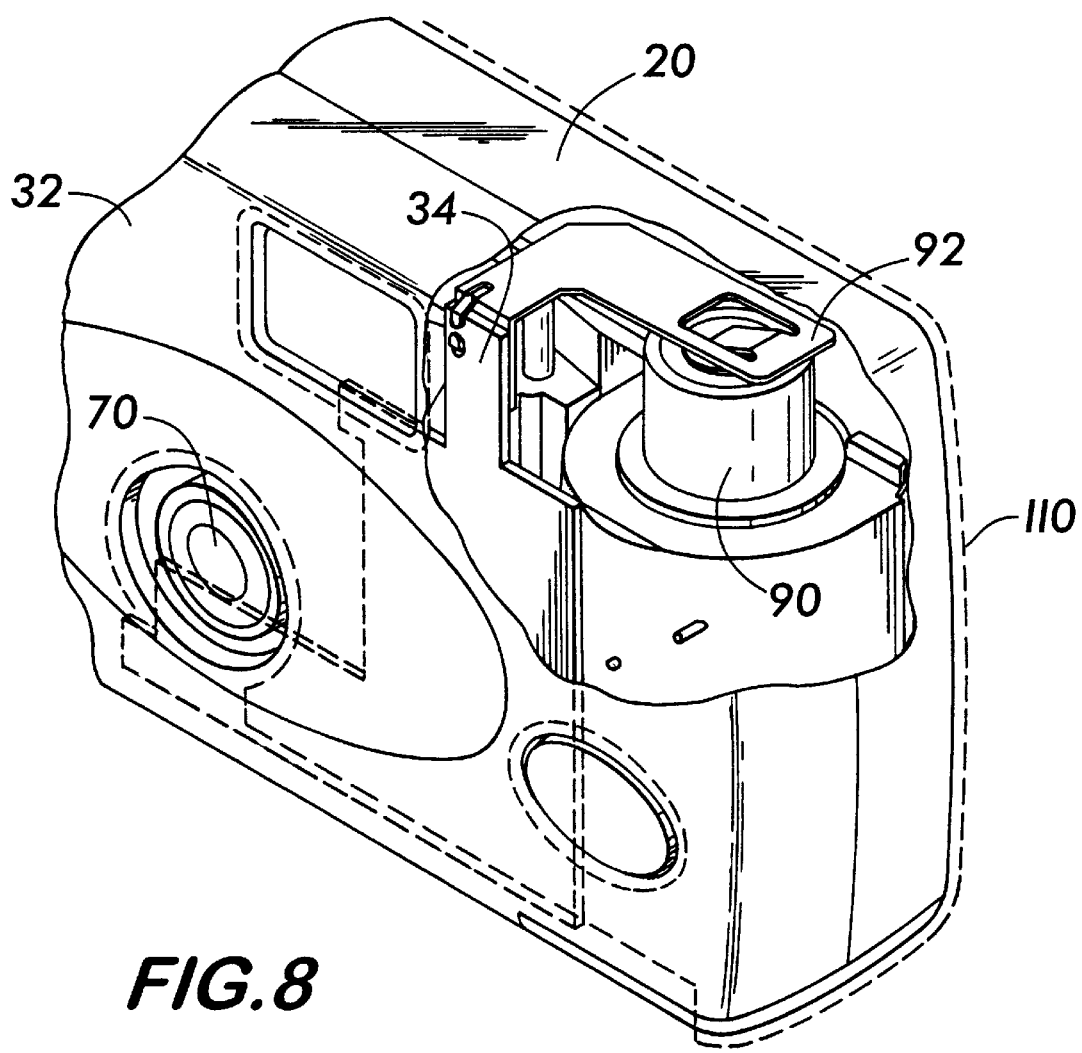
FIG. 8 is a partially cut-away perspective view of a camera according to the present invention, showing additional details thereof.

As best shown in FIGS. 5, 6 and 18, main body 12 has a portion 98, defining a collar, that light tightedly envelopes the spool 18, including the bottom periphery thereof. See also FIG. 8. Thus, once the film cassette 26 has been inserted into the camera and the film cassette tab 74 has been placed on the film cassette loading port 72, and before the tab 84 has been placed over opening 80 below the spool in the bottom of the camera, the only path for meaningful amounts of light to enter the camera is via the opening 80 and slot 36. This path is illustrated by an arrow 100 in FIG. 12. However, once the leading edge 38 of the film has entered the slot 36 and the spool 18 has been rotated even slightly, this path is eliminated because, as seen in FIGS. 14 and 15, the film forming the leading edge 38 blocks that entry point. It has been found that the above described camera design also prevents any substantial amount of light from traveling far enough along the portions of the film path 68c, b to expose film in the cassette 26 when the light lock door 30 has been opened. It will be appreciated that this is a substantial feature of the invention, since, in the above described practice of the invention, there is a period of time between the time that the light lock door 30 is first opened and the time that the film edge 38 finally blocks the slot 36. If any substantial amount of light were permitted to travel far enough along the film path during this interval, then the film inside the cassette could be exposed. In the practice of the invention, however, only a leader portion of the film, i.e., the portion that is first withdrawn from the cassette 26 to the slot 36, can be exposed.

Figure 2:
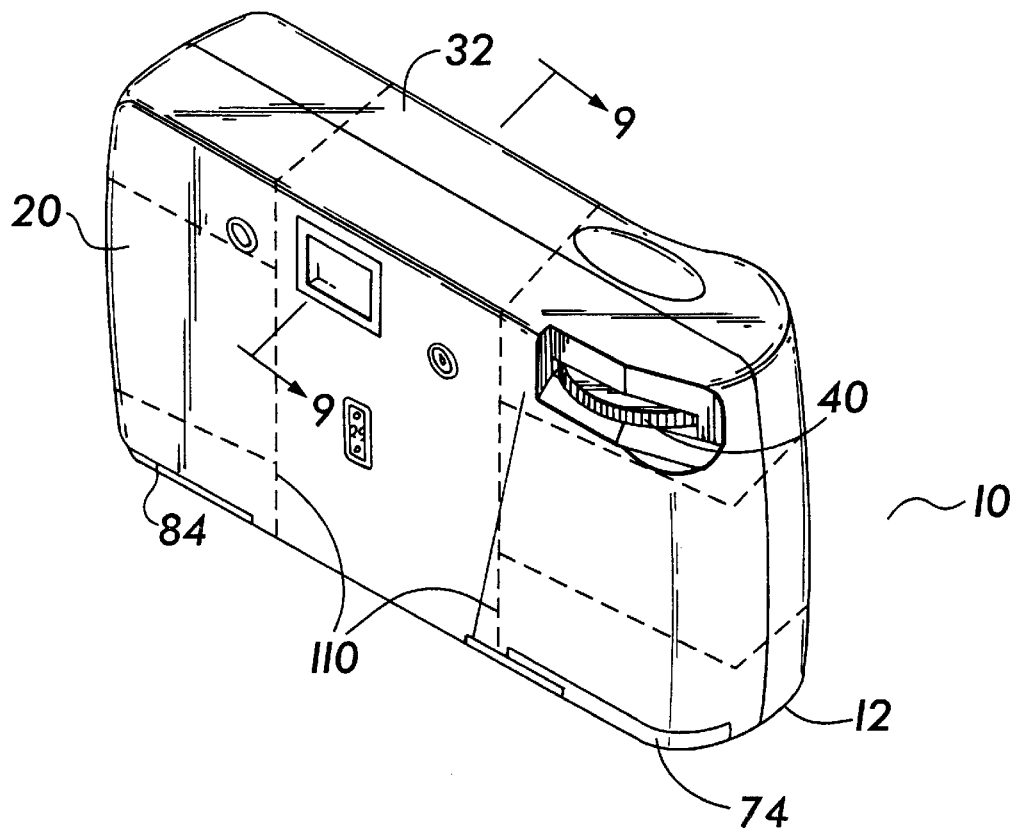
FIG. 2 is a rear perspective view of the camera of FIG. 1.
Figure 9:
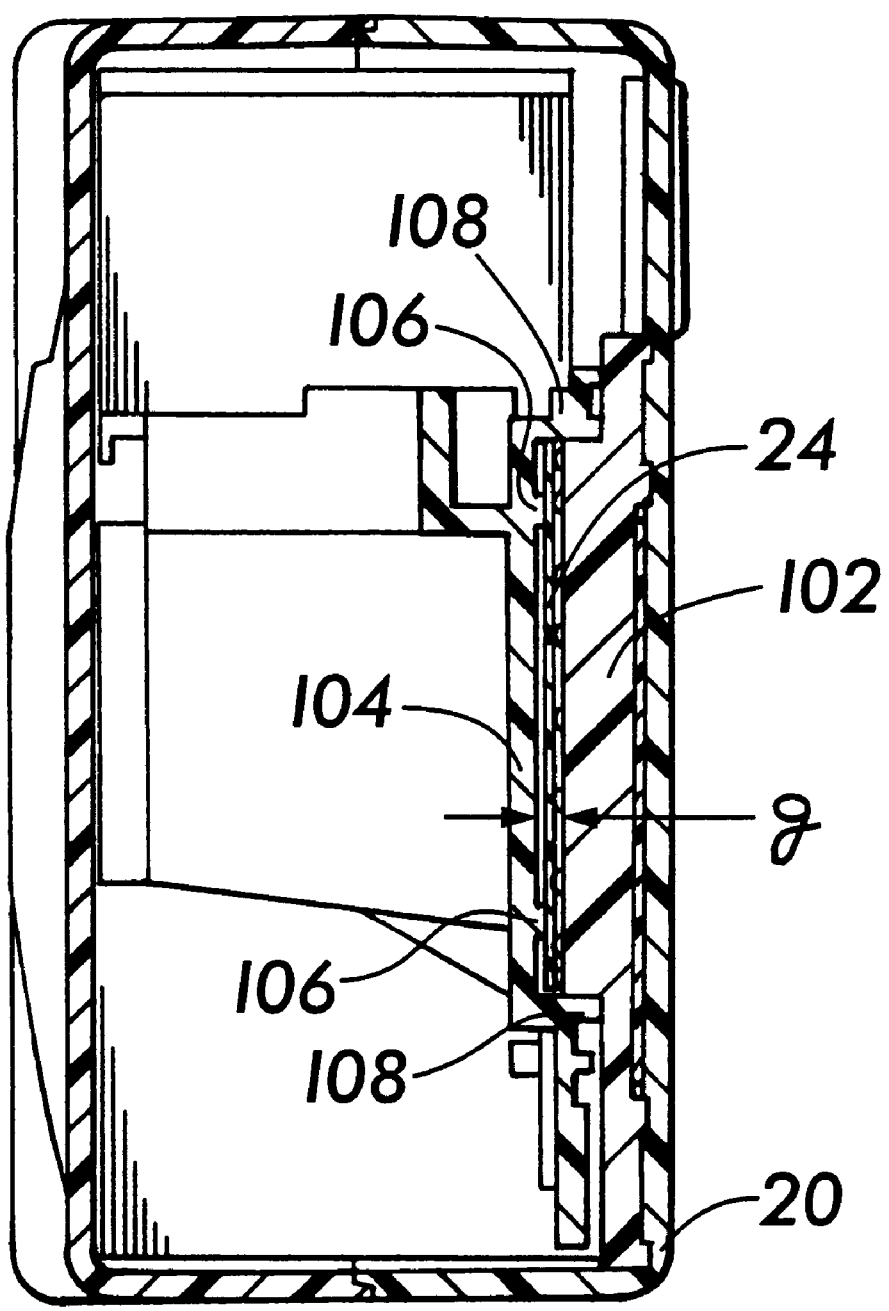
FIG. 9 is a cross section taken through line 9—9 of FIG. 2.

As shown in FIG. 9 (which is a cross section of camera 10 taken through the film exposing area, as shown in FIG. 2), the back cover 20 has a pressure plate 102 that extends toward the front of the camera 10. The main body 12 has a recessed portion that extends toward the back cover 20 of the camera 10, film guides 106 that guide the film 24 through the portion 68b of the film path and film rails 108 that the film 24 rests between in a portion of the film path 68b. There is a gap g formed between the pressure plate 102 and the recessed portion 104, defining that part of the film path 68b near the center (film exposing area) of the camera 10.

Using a standard APS film cassette, experiments were carried with one embodiment of a camera 10 having the following characteristics, and in an illuminated room having the following light level, and no film in the cassette was found to be exposed:

| | |
|---|---|
| Film thickness: | 0.1 mm. |
| Width $w_1$ of slot 36 at inner periphery of spool 18 (see FIG. 13): | 1.0 mm. |
| Width $w_2$ of slot 36 at outer periphery of spool 18 (see FIG. 13): | 2.0 mm. |
| Length $l_1$ of slot 36 (see FIG. 5): | 46 mm. |
| Length $l_2$ of film path 68a,b,c (see FIG. 16): | 54 mm. |
| Width of gap g (see FIG. 9): | 0.5–0.6 mm. |
| Light level in room (measured in light value (LV): | LV 6 – LV 7 |

In an alternative film loading method, the driver 82 is inserted into the spool 18 in a light tight manner (i.e., to prevent light from entering the interior 96 of spool 18) before the light lock door 30 is opened. Then the light lock door 30 is opened, and the leading edge 38 of film 24 is advanced into the slot 36, as above described. Next, the driver 82 is rotated, as also above described. This prevents any light from entering the film path 68a,b,c anytime during a film loading procedure. Thus, according to this embodiment of the film loading method, light entering the camera to expose film is not a concern because, when the driver is removed, spool 18 will have been pre-wound and no light can enter via slot 36 at any time.

Figure 18A:
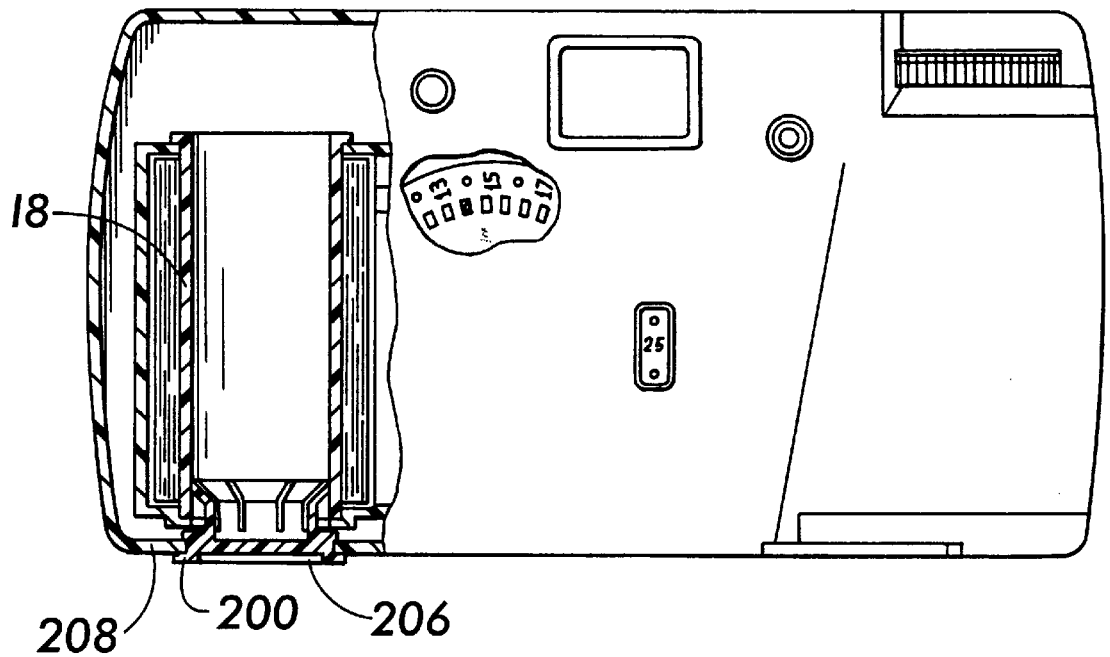
FIGS. 18A–C illustrate a variation of the camera of FIGS. 1–17 that employs a rotatable tab that engages a spool portion of the camera.
Figure 18B:
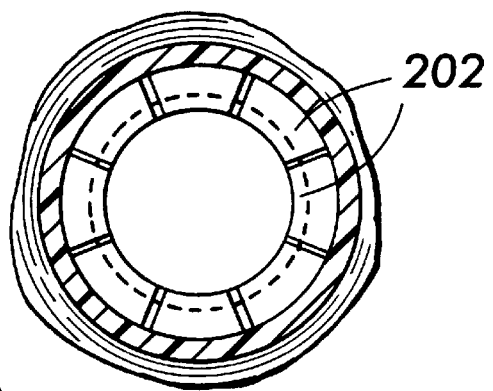
Figure 18C:
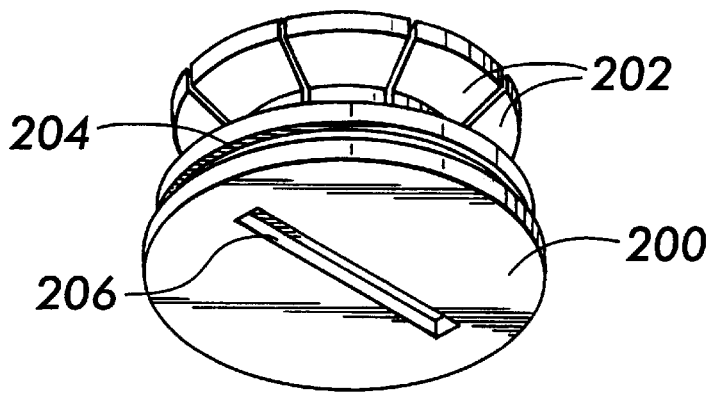

FIGS. 18A–18C illustrate a variation of the above described camera. In the camera of FIG. 18, the tab 84 that covers opening 80 has been replaced with a slotted rotatable tab 200 having a plurality of prongs 202. In the camera of FIG. 18, the opening 80 is circular so as to rotatably receive the tab 200. Slot 206 is adapted to be engaged with a screwdriver or other rotatable apparatus so as to rotate the tab 200 after it has been inserted in to the opening 80. Prongs 202 are preferably resilient so that they can be flexed radially inwardly, toward the center of tab 200, to permit insertion of tab into opening 80. Tab 200 is then urged into opening 80 until the circumferential groove 204 light tightedly and rotatably engages with the corresponding portion of the camera body 208. After insertion, prongs 202 are permitted to relax and frictionally engage the inner periphery of spool 18, so that rotation of tab 200 also rotates spool 18. Thus, the camera of FIG. 18 may be loaded by first inserting the tab 200 into the opening 80, then scrolling the film across the film path and into the spool 18 as above described. Pre-winding is then accomplished by externally rotating the tab 200 to rotate the spool 18.

In the practice of certain aspects of the invention, the film in film spool compartment 16 and wound around spool 18 may be exposed film that has been withdrawn from the cassette 26 only as exposures are taken; the exposed film is then rewound back into the cassette 26 before the camera is opened, as is typical in most re-usable cameras.

The preferred embodiment of the invention has been described as having a cylindrical or tubular structure that defines the spool 18. As set forth above, however, it should be understood that certain aspects of the invention are not limited in scope to this embodiment, and an embodiment that does not employ any such structure is contemplated. For example, the film 24 may simply wind about itself in the film spool compartment 16, and the cavity formed therein defines the battery compartment. Thus, as used in the claims, and except as noted otherwise, the terms "spool" and "film spool" are intended to encompass such embodiment.

Other portions of the camera 10 illustrated in the drawings are well known in the art, and no further explanation thereof is required.

Preferably, the camera 10 is a plastic single use camera, as described in the background section above. Thus, in a preferred embodiment, the main body 12 and back cover 20 are secured together by locking means, screws, adhesive, thermal bonding etc. prior to the above described film loading process in such manner that the back cover 20 is not easily removed by the end user. As is typical, and as depicted by the heavy dashed lines 110 in FIGS. 1, 2, 8 and 17, packaging, such as adhesive backed paper, cardboard or even plastic, preferably surrounds at least portions of the camera 10. As is common, this packaging contains indicia that points out various parts of the camera (shutter, flash charge button, etc.) and/or instructions for use. As is also common, it is preferred that this packaging must be removed and destroyed, at least in part, to open or dissemble the camera to remove the film cassette 26 and/or battery 90 from the camera. Thus, it is also preferred that this packaging cover at least tab 74 and/or tab 84, and a portion of back cover 20 so that destruction of at least part of the packaging must be destroyed to remove tab 84 (to remove the battery), to remove tab 74 (to remove the film cassette) or to remove the back cover 20. Although it is known that these cameras may be recycled, reloading film therein usually requires removal of the back cover 20 (except in the practice of the above described film loading aspect of the present invention), and hence destruction of at least a portion of the packaging or even, in some cases, destruction of at least a portion of the camera body.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An APS camera of the type that employs an APS film cassette having a light lock door comprising:
    a) a film advance mechanism that is rotatable in a first direction to scroll film out of the film cassette and in a second direction to wind film into the cassette; and,
    b) an light lock door driver engagable to the film advance mechanism and adapted to cooperate with the light lock door to open the light lock door in cooperation with rotation of the film advance mechanism in the first direction and to close the light lock in cooperation with rotation of the film advance in the second direction.

2. The camera according to claim 1 further comprising an engaging/disengaging mechanism and a film sensor, the engaging/disengaging mechanism engaging the light lock door driver to the film advance mechanism when the film sensor detects that film is not present in a selected portion of a film path of the camera, and disengaging the light lock door driver from the film advance mechanism when the film sensor detects that film is present in the selected portion of a film path.

3. The camera according to claim 1 wherein the film advance mechanism comprises a user rotatable manual advance wheel.

4. The camera according to claim 1 further comprising means engagable with the film advance mechanism for preventing the film advance mechanism from being rotated in the first direction when engaged with the film advance.

5. An APS camera comprising:
    a) a film advance mechanism comprising a manual advance wheel, a driving gear, and a first shaft adapted to mate with a first part of an APS film cassette;
    b) a light lock door driver comprising a second shaft adapted to mate with a second part of the APS film cassette coupled to a light lock door of the film cassette, the light lock door driver having a plurality of gear teeth defining a segmented portion;
    c) a coupling gear engaged with the driving gear and being engagable and disengagable to and from the segmented portion;
    d) a spring biased lever carrying the coupling gear and being pivotable to engage and disengage the coupling gear to and from the segmented portion; and,
    e) a film sensor coupled to the lever and disposed adjacent a portion of the film path of the camera, the film sensor biasing the lever so as to disengage the coupling gear from the segmented portion when film is present in the film path, the spring biasing the lever so as to engage the coupling gear to the segmented portion when film is not present in the film path;
    rotation of the manual advance wheel being operative to open or close the light lock door only when the coupling gear is engaged to the segmented portion.

6. The camera according to claim 5 wherein the manual advance wheel is rotatable in a first direction to open the light lock door, and wherein further rotation of the manual advance wheel in the first direction is operable to advance film out of the film cassette.

7. The camera according to claim 6 wherein the manual advance wheel is rotatable in a second direction opposite to the first direction to withdraw film into the film cassette and wherein, when no film is present in the film path adjacent the film sensor, further rotation of the manual advance wheel in the second direction is operable to close the light lock door.

8. The camera according to claim 7 further comprising a preventer engagable with the advance mechanism that, when engaged, prevents actuation in the first direction but permits actuation in the second direction, the advance mechanism being rotatable in the first direction only when the preventer is not engaged.

9. The camera according to claim 5 further comprising means for winding the film from the film cassette into a spool on an opposite side of the camera from the film cassette by means external to the camera without exposing unexposed film in the film cassette to any substantial amount of light after the light lock door has been opened.

10. The camera according to claim 9 further comprising a battery compartment defined within a portion of the camera defining a film spool compartment adapted to hold film withdrawn from the film cassette.

11. In a camera of the type that employs an APS film cassette having a light lock door, a film cassette compartment for holding the film cassette and a film spool compartment for holding unexposed film withdrawn from the film cassette at opposing sides thereof, and a film path disposed therebetween comprising:
    a) a film sensor disposed on a main body of the camera and along the film path and being biased into the film path;
    b) a back cover assembled to the main body and covering the film cassette compartment, film spool compartment, film path and film sensor, the main body and assembled back cover defining a casing; and,
    c) structure associated with the film sensor disposed interiorly of the camera and mounted to the casing, the structure being operable exteriorly of the casing, in the presence of the film cassette in the film cassette compartment before unexposed film has been withdrawn from the film cassette to the film spool compartment, to urge the film sensor out of the film path.

12. The camera according to claim 11 wherein the structure associated with the film sensor comprises a lever coupled to the film sensor, the lever having a portion accessible exteriorly of the casing.

13. The camera according to claim 12 further comprising a light lock door driver for operating the light lock door and an engaging/disengaging mechanism coupled to the lever that engages the light lock door driver to a film advance mechanism when the lever is in a first condition and disengages the light lock door driver from the film advance mechanism when the lever is in a second condition.

14. The camera according to claim 11 further comprising a light lock door driver engageable with the film cassette and being coupled to the structure, the light lock door driver being engagable to and disengagable from a film advance mechanism, the structure being accessible exteriorly of the casing to at least disengage the light lock door driver from the film advance wheel.

15. The camera according to claim 11 wherein the film sensor is disposed adjacent the film cassette compartment so as to sense the passage of a trailing edge of film into the film cassette, and wherein the structure associated with the film sensor is accessible to urge the film sensor out of the film path without exposing film in the cassette when the light lock door is open.

16. In a camera of the type that employs an APS film cassette having a light lock door, a film cassette compartment for holding the film cassette and a film spool compartment for holding film withdrawn from the film cassette at opposing sides thereof, and a film path disposed therebetween comprising:

a) a film sensor disposed on a main body of the camera and along the film path and being biased into the film path;

b) a back cover assembled to the main body and covering the film cassette compartment, film spool compartment, film path and film sensor, the main body and assembled back cover defining a casing; and, (c) structure associated with the film sensor disposed interiorly of the camera and mounted to the casing and being operable exteriorly of the casing to urge the film sensor out of the film path without removing any camera parts from the camera.

* * * * *